(12) United States Patent
Zhu et al.

(10) Patent No.: US 10,971,983 B2
(45) Date of Patent: Apr. 6, 2021

(54) LINEAR VIBRATION MOTOR

(71) Applicant: GOERTEK INC., Weifang (CN)

(72) Inventors: Yueguang Zhu, Weifang (CN); Baoyu Liu, Weifang (CN); Dezhang Shi, Weifang (CN)

(73) Assignee: GOERTEK INC., Weifang (CN)

(*) Notice: Subject to any disclaimer, the term of this patent is extended or adjusted under 35 U.S.C. 154(b) by 297 days.

(21) Appl. No.: 16/083,934

(22) PCT Filed: Jun. 1, 2016

(86) PCT No.: PCT/CN2016/084293
§ 371 (c)(1),
(2) Date: Sep. 11, 2018

(87) PCT Pub. No.: WO2017/152516
PCT Pub. Date: Sep. 14, 2017

(65) Prior Publication Data
US 2020/0295646 A1 Sep. 17, 2020

(30) Foreign Application Priority Data

Mar. 11, 2016 (CN) .......................... 201610140464.1

(51) Int. Cl.
*H02K 33/02* (2006.01)
*H02K 5/24* (2006.01)

(52) U.S. Cl.
CPC ............. *H02K 33/02* (2013.01); *H02K 5/24* (2013.01)

(58) Field of Classification Search
CPC .................................. H02K 33/02; H02K 5/24
(Continued)

(56) References Cited

U.S. PATENT DOCUMENTS 8,384,259 B2 * 2/2013 Choi ...................... H02K 33/16
310/81
8,643,229 B2 * 2/2014 Park ....................... H02K 33/16
310/15
(Continued)

FOREIGN PATENT DOCUMENTS

CN 103098357 A 5/2013
CN 103618428 A 3/2014
(Continued)

*Primary Examiner* — John K Kim
(74) *Attorney, Agent, or Firm* — Saliwanchik, Lloyd & Eisenschenk

(57) ABSTRACT

The present invention relates to the technical field of electronic products, and provides a linear vibration motor. The linear vibration motor comprises a motor housing, a stator, a vibrator, and two elastic supports for suspending the vibrator within the motor housing, for supporting the vibrator and for providing elastic restoring forces, wherein the elastic supports are located at two ends of the vibrator in a vibration direction respectively. Each of the elastic supports is made up of a plurality of elastic sheets whose one ends are fixedly connected in sequence, which are arranged side by side and which have C-shaped openings respectively. Each of the elastic supports comprises a first connection point fixedly connected to the vibrator and a second connection point fixedly connected to the inner wall of the motor housing. Therefore, the polarization phenomenon of a vibration block is reduced when the vibration feedback to a user's touch operation is realized, the noise is reduced, and the stability and the reliability of the entire linear vibration motor are improved.

10 Claims, 3 Drawing Sheets

(58) Field of Classification Search
USPC .......................................................... 310/29
See application file for complete search history.

(56) References Cited

U.S. PATENT DOCUMENTS

| | | | | |
|---|---|---|---|---|
| 8,682,396 | B2* | 3/2014 | Yang ..................... | H04M 1/00 |
| | | | | 455/567 |
| 10,468,957 | B2* | 11/2019 | Zhu ........................ | H02K 33/18 |
| 2011/0089772 | A1* | 4/2011 | Dong ..................... | H02K 33/16 |
| | | | | 310/25 |
| 2011/0101798 | A1* | 5/2011 | Lee ........................ | H02K 33/16 |
| | | | | 310/29 |
| 2011/0266892 | A1* | 11/2011 | Wauke ................... | B06B 1/045 |
| | | | | 310/25 |
| 2016/0013710 | A1* | 1/2016 | Dong ..................... | H02K 33/16 |
| | | | | 310/25 |
| 2019/0036435 | A1* | 1/2019 | Zhu ........................ | H02K 33/06 |
| 2019/0081544 | A1* | 3/2019 | Zhu ........................ | H02K 33/16 |
| 2019/0222106 | A1* | 7/2019 | Liu ........................ | H02K 33/02 |

FOREIGN PATENT DOCUMENTS

| | | |
|---|---|---|
| CN | 103762815 A | 4/2014 |
| CN | 105226909 A | 1/2016 |
| CN | 204947873 U | 1/2016 |
| CN | 205004932 U | 1/2016 |
| CN | 105656274 A | 6/2016 |
| JP | 2004104906 A | 4/2004 |

\* cited by examiner

LINEAR VIBRATION MOTOR

CROSS REFERENCE TO RELATED APPLICATIONS

This application is a National Stage of International Application No. PCT/CN2016/084293, filed on Jun. 1, 2016, which claims priority to Chinese Patent Application No. 201610140464.1, filed on Mar. 11, 2016, both of which are hereby incorporated by reference in their entireties.

TECHNICAL FIELD

The present invention relates to the technical field of electronic products, and in particular, to a linear vibration motor.

BACKGROUND

At present, with the rapid development of portable consumer electronics, consumers are increasingly favoring electronic products that are more lighter and thinner and have a better tactile experience. The linear vibration motor is generally used as an execution mechanism for tactile experience and functions for system vibration feedback. The development trend of thinner and lighter electronic products determines that elastic supports must also be improved towards a flat profile.

Linear vibration motors mostly achieve overall vibration through elastic supports. The elastic supports are mostly springs or elastic sheets. The elastic supports in the form of the springs or the elastic sheets are mainly designed based on a space inside each linear vibration motor, and are different in shape and connection manner respectively. However, the design structures of the elastic supports commonly available on the market are unreasonable, which results in that the elastic supports easily cause stress concentration during the vibration process, resulting in plastic deformation, polarization, and relatively large noise, thereby affecting the user experience and use.

SUMMARY

An objective of the present invention is to provide a linear vibration motor that aims to solve the problem that the design structure of an elastic support in the prior art is unreasonable, which results in that the elastic support easily causes stress concentration during the vibration process, resulting in plastic deformation, polarization, and relatively large noise, thereby affecting the user experience and use.

The present invention is implemented as below. A linear vibration motor comprises a motor housing, a stator, a vibrator, and two elastic supports for suspending the vibrator within the motor housing, for supporting the vibrator and for providing elastic restoring forces. The two elastic supports are located at two ends of the vibrator in a vibration direction.

Each of the elastic supports is made up of a plurality of elastic sheets whose one ends are fixedly connected in sequence, which are arranged side by side and which have C-shaped openings respectively. Each of the elastic supports comprises a first connection point fixedly connected to the vibrator and a second connection point fixedly connected to the inner wall of the motor housing.

As an improved solution, the C-shaped openings of the plurality of elastic sheets all face the same direction.

As an improved solution, the C-shaped openings of the adjacent elastic sheets of each elastic support face opposite directions.

As an improved solution, the first connection points of the elastic supports arranged at two ends of the vibrator are diagonally arranged in a region defined by the motor housing.

As an improved solution, the vibrator comprises a mass block and magnets, wherein the mass block is provided with mounting holes allowing the magnets to be mounted therein.

As an improved solution, the first connection points of the two elastic supports are arranged in the center of each of the sidewalls on two sides of the mass block in the vibration direction respectively.

As an improved solution, a stop block is arranged at a position where the first connection point and the sidewall of the mass block are connected and a position where the second connection point and the inner wall of the motor housing are connected, respectively.

As an improved solution, a damping block is arranged on the stop blocks respectively;

a make-way mechanism for increasing a damping area of the damping block is arranged on each stop block.

As an improved solution, the stator comprises a circuit board which is fixed to the inner wall of the motor housing and connected to a coil.

As an improved solution, the motor housing comprises an upper housing and a lower housing.

The linear vibration motor comprises the motor housing, the stator, the vibrator, and two elastic supports for suspending the vibrator within the motor housing, for supporting the vibrator and for providing elastic restoring forces. The two elastic supports are located at two ends of the vibrator in a vibration direction. Each of the elastic supports is made up of a plurality of elastic sheets whose one ends are fixedly connected in sequence, which are arranged side by side and which have C-shaped openings respectively. Each of the elastic supports comprises a first connection point fixedly connected to the vibrator and a second connection point fixedly connected to the inner wall of the motor housing. Therefore, the polarization phenomenon of a vibration block in a vibration process is reduced when the vibration feedback to a user's touch operation is realized, the noise is reduced, and the stability and the reliability of the entire linear vibration motor are improved.

the reference signs represent the following components: 1—vibrator; 2—elastic support; 3—elastic sheet; 4—first connection point; 5—second connection point; 6—mass block; 7—magnet; 8—washer plate; 9—stop block;

10—damping block; 11—circuit board; 12—coil; 13—upper housing; 14—lower housing.

DETAILED DESCRIPTION

In order to make the objective, the technical solution and the advantages of the present invention more clearly, the present invention is further illustrated in details below in conjunction with the drawings and the embodiments. It should be understood that, the specific embodiments described herein are merely used to illustrate the present invention rather than limit the present invention.

Figure 1:
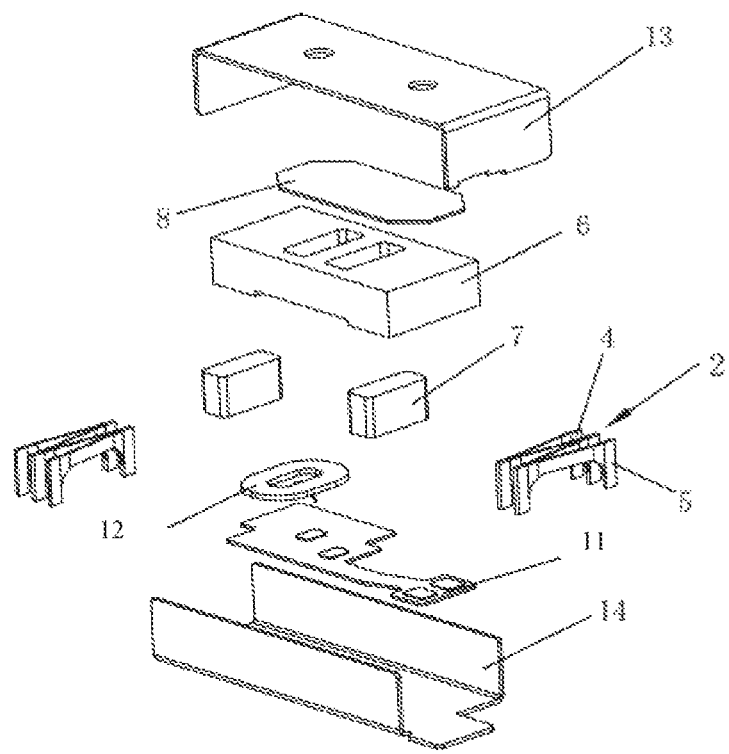
FIG. 1 is an exploded schematic view of a linear vibration motor provided by Embodiment 1 of the present invention.
Figure 2:
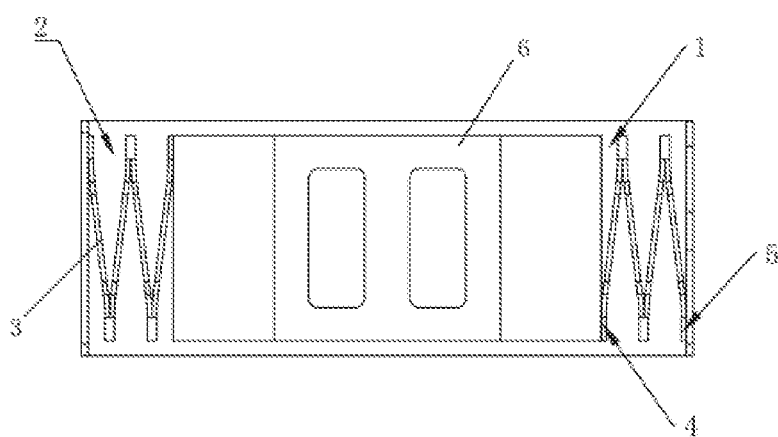
FIG. 2 is a top view of FIG. 1.

FIG. 1 and FIG. 2 illustrate an exploded schematic view of a linear vibration motor provided by the present invention respectively, in which only parts relevant to the present invention are shown for ease of illustration.

As shown in FIGS. 3 to 7, the linear vibration motor comprises a motor housing, a stator, a vibrator 1, and two elastic supports 2 for suspending the vibrator 1 within the motor housing, for supporting the vibrator 1 and for providing elastic restoring forces. The two elastic supports 2 are located at two ends of the vibrator 1 in a vibration direction respectively.

Each of the elastic supports 2 is made up of a plurality of elastic sheets 3 whose one ends are fixedly connected in sequence, which are arranged side by side and which have C-shaped openings respectively. Each of the elastic supports 2 comprises a first connection point 4 fixedly connected to the vibrator 1 and a second connection point 5 fixedly connected to the inner wall of the motor housing.

Figure 7:
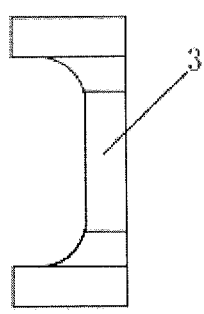
FIG. 7 is a schematic structural view of an elastic sheet provided by the present invention.

In the present embodiment, as shown in FIG. 7, the elastic sheets 3 may be slightly bent according to an actual space of a product, and will not be described here.

The plurality of elastic sheets 3 may be fixedly connected in a form of forward welding. By means of this connection manner, the space of the elastic supports 2 in the vibration direction of the vibrator 1 is saved, and meanwhile the rigidity of the elastic sheets 3 in the vibration direction is effectively reduced, such that the compliance of the elastic sheets 3 in the vibration direction is larger to effectively reduce the inherent frequency of the entire linear vibration motor. In the meantime, in the case of the same driving force, a larger displacement is obtained in the vibration direction, and a higher vibration sense can be achieved.

In the meantime, the elastic sheets 3 welded forwardly together may share the stress of each elastic sheet 3, thereby effectively reducing the phenomenon of stress concentration. By means of a flat structure, the occupied space after compression is smaller, the vibration stability is higher, the vibration offset is smaller, and the reliability and the service life of the product are greatly improved and prolonged.

Figure 3:
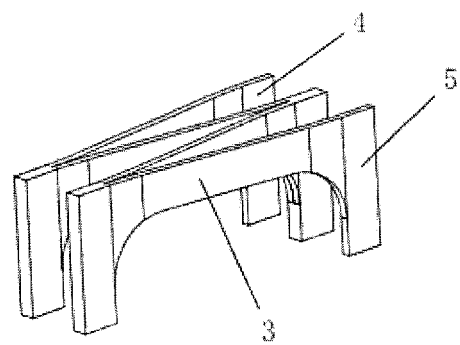
FIG. 3 is a schematic structural view of an elastic support provided by Embodiment 1 of the present invention.

As shown in FIGS. 1 to 3, the C-shaped openings of the plurality of elastic sheets 3 face the same direction, i.e., the plurality of elastic sheets 3 is connected together side by side according to the direction of the C-shaped openings to form the corresponding elastic support 2.

Figure 4:
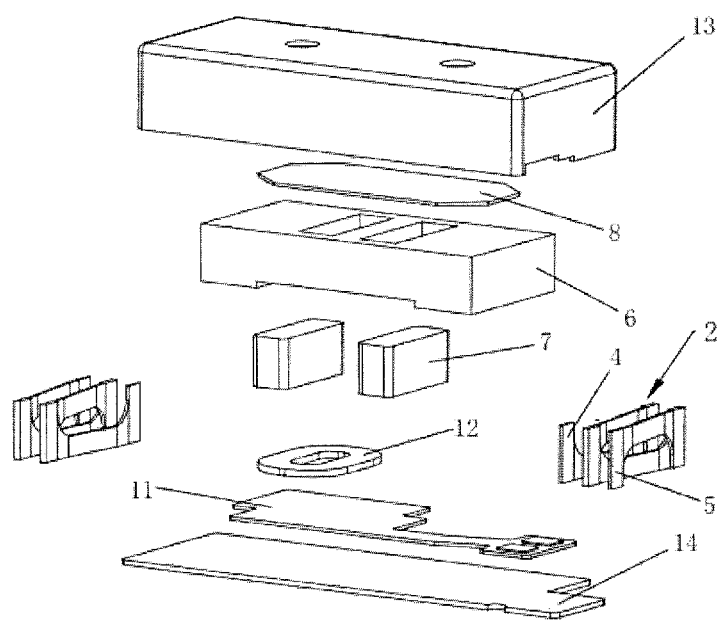
FIG. 4 is an exploded schematic view of a linear vibration motor provided by Embodiment 2 of the present invention.
Figure 5:
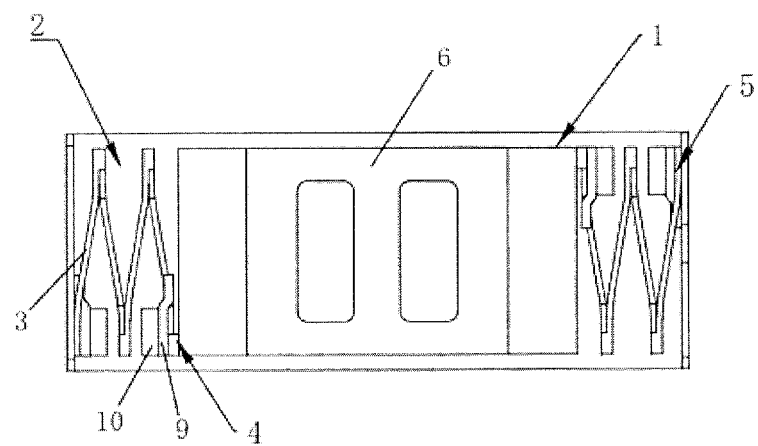
FIG. 5 is a top view of FIG. 4.
Figure 6:
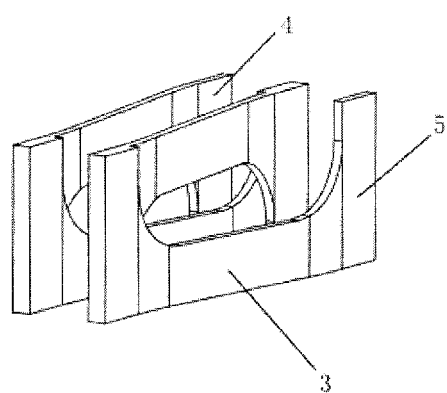
FIG. 6 is a schematic structural view of an elastic support provided by Embodiment 2 of the present invention.

As shown in FIGS. 4 to 6, the C-shaped openings of the adjacent elastic sheets 3 of each elastic support 2 face opposite directions, i.e., the plurality of elastic sheets 3 every two of which face opposite directions and are connected together side by side form the elastic support 2 according to the directions of the C-shaped openings.

As shown in FIG. 7, each elastic sheet 3 has a structure of a C-shaped opening. The number of the elastic sheets 3 in each elastic support 2 may be set according to actual demands. The case of four elastic sheets 3 is given in FIGS. 1 to 6. Of course, other numbers, i.e., at least two elastic sheets are also available.

In the present invention, the vibrator 1 comprises a mass block 6 and magnets 7 except for the elastic supports 2 described above. As shown in FIG. 1 and FIG. 4, the mass block 6 is provided with mounting holes allowing the magnets 7 to be mounted therein. The magnets 7 may be mounted by adopting a washer plate 8. Of course, other manners may also be adopted.

A position where the first connection point 4 of each elastic support 2 and the mass block 6 are connected and a position where the second connection point 5 of each elastic support 2 and the inner wall of the motor housing are connected may be set according to actual situations, e.g., according to the following two manners.

(1) The first connection points 4 of the elastic supports 2 arranged at two ends of the vibrator 1 are diagonally arranged in a region defined by the motor housing. As shown in FIG. 2 and FIG. 5, the second connection points 5 corresponding to the first connection points 4 may also be arranged at corresponding positions.

(2) The first connection points 4 of the two elastic supports 2 are arranged in the center of each of the sidewalls on two sides of the mass block 6 in the vibration direction respectively. That is, the first connection points 4 are arranged in the centers of the sidewalls of the mass block 6, and the second connection points 5 may also be arranged in the center of the inner wall side surface of the motor housing. The inner wall side surface of the motor housing is close and parallel to the sidewalls of the mass block 6, on which the first connection points 4 are arranged.

Of course, the first connection points 4 and the second connection points 5 may be arranged in other manners, which will not be described herein again.

In the present invention, the first connection points 4 and the second connection points 5 may be fixed by welding. In order to make the welding more stable, the following setting may be adopted.

As shown in FIG. 5, a stop block 9 is arranged at a position where the first connection point 4 and the sidewall of the mass block 6 are connected and a position where the second connection point 5 and the inner wall of the motor housing are connected, respectively.

As shown in FIG. 5, a damping block 10 is arranged on the stop blocks 9 respectively to play a buffering role. The stop blocks 9 and the damping blocks 10 are combined to play a role of limiting blocks and effectively control a vibration displacement of the vibrator 1.

A make-way mechanism for increasing a damping area of the damping block 10 is arranged on each stop block 9. The damping block 10 does not occupy an internal space of the motor housing by means of the arrangement of the make-way mechanism.

In the present invention, the stator comprises a circuit board 11 which is fixed to the inner wall of the motor housing and connected to a coil 12. The structures of the circuit board 11 and the coil 12 will not be described herein.

In the present invention, the motor housing may comprise an upper housing 13 and a lower housing 14. The upper housing 13 and the lower housing 14 are buckled to form a space for accommodating the vibrator 1 and the stator. Of course, other manners may also be used.

In the present invention, the linear vibration motor comprises the motor housing, the stator, the vibrator 1, and the two elastic supports 2 for suspending the vibrator 1 within the motor housing, for supporting the vibrator 1 and for providing elastic restoring forces. The two elastic supports 2 are located at two ends of the vibrator 1 in a vibration direction respectively. Each of the elastic supports 2 is made up of a plurality of elastic sheets 3 whose one ends are fixedly connected in sequence, which are arranged side by side and which have C-shaped openings respectively. Each of the elastic supports 2 comprises a first connection point 4 fixedly connected to the vibrator 1 and a second connection point 5 fixedly connected to the inner wall of the motor housing. Therefore, the polarization phenomenon of a vibration block in a vibration process is reduced when the vibration feedback to a user's touch operation is realized, the noise is reduced, and the stability and the reliability of the entire linear vibration motor are improved.

The above-mentioned embodiments are just preferred embodiments of the present invention and are not intended to limit the present invention. Any modifications, equivalent replacements and improvements made within the spirit and principle of the present invention should be included within the protection scope of the present invention.

The invention claimed is:

1. A linear vibration motor, comprising a motor housing, a stator, a vibrator, and two elastic supports for suspending the vibrator within the motor housing, for supporting the vibrator and for providing elastic restoring forces, wherein the two elastic supports are located at two ends of the vibrator in a vibration direction thereof respectively;
    each of the elastic supports is made up of a plurality of elastic sheets whose one ends are fixedly connected in sequence, which are arranged side by side and which have C-shaped openings respectively; each of the elastic supports comprises a first connection point and a second connection point,
    wherein the first connection point is fixedly connected to an end surface of the vibrator perpendicular to the vibration direction of the vibrator, and the second connection point is fixedly connected to an inner wall of the motor housing perpendicular to the vibration direction of the vibrator,
    wherein the C-shaped openings of the plurality of elastic sheets are open in a direction perpendicular to the vibration direction of the vibrator, and
    wherein the plurality of elastic sheets are fixedly connected in a form of forward welding, and are thus arranged to be overlapped when viewed from the vibration direction of the vibrator.

2. The linear vibration motor according to claim 1, wherein the C-shaped openings of the plurality of elastic sheets all face the same direction.

3. The linear vibration motor according to claim 1, wherein the C-shaped openings of neighboring elastic sheets of each elastic support face opposite directions.

4. The linear vibration motor according to claim 1, wherein the first connection points of the elastic supports arranged at two ends of the vibrator are diagonally arranged in a region defined by the motor housing.

5. The linear vibration motor according to claim 1, wherein the vibrator comprises a mass block and magnets, and the mass block is provided with mounting holes allowing the magnets to be mounted therein.

6. The linear vibration motor according to claim 5, wherein the first connection points of the two elastic supports are respectively arranged on sidewalls on two sides of the mass block, and are disposed oppositely from each other, in the vibration direction, about a center of the mass block.

7. The linear vibration motor according to claim 5, wherein a stop block is arranged at a position where the first connection point and the sidewall of the mass block are connected and a position where the second connection point and the inner wall of the motor housing are connected, respectively.

8. The linear vibration motor according to claim 7, wherein a damping block is arranged on the stop blocks respectively; and
    a make-way mechanism for increasing a damping area of the damping block is arranged on each stop block.

9. The linear vibration motor according to claim 1, wherein the stator comprises a circuit board which is fixed to a lower portion of the motor housing and connected to a coil.

10. The linear vibration motor according to claim 1, wherein the motor housing comprises an upper housing and a lower housing.

* * * * *